United States Patent Office 2,983,459
Patented May 9, 1961

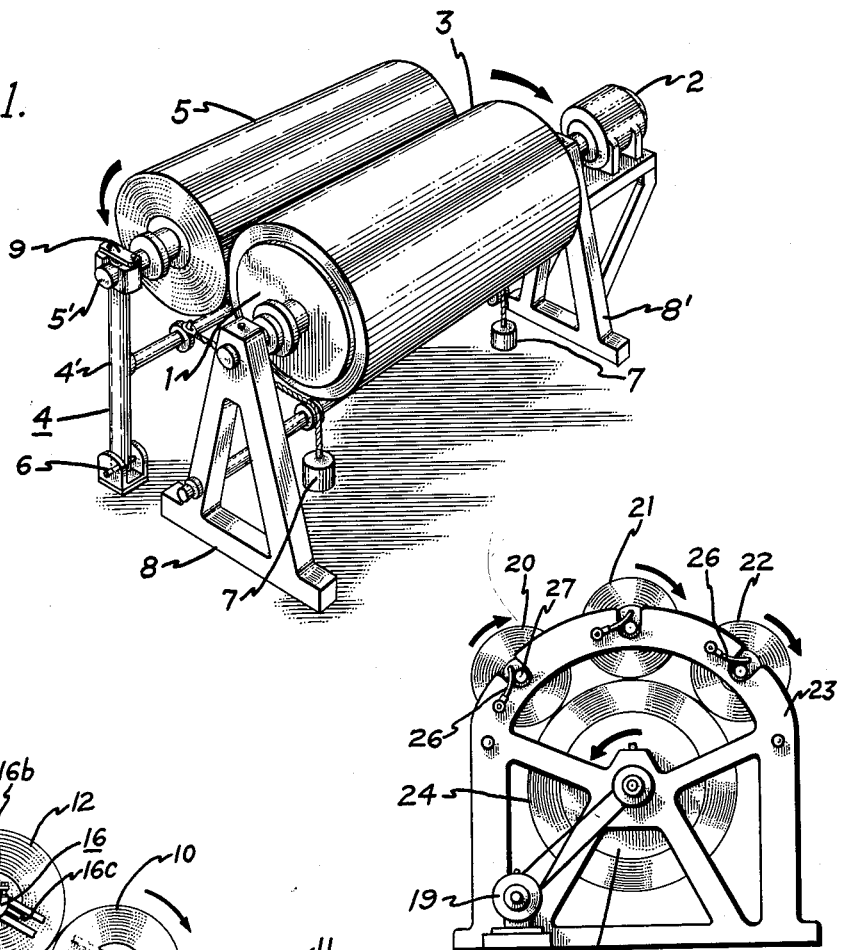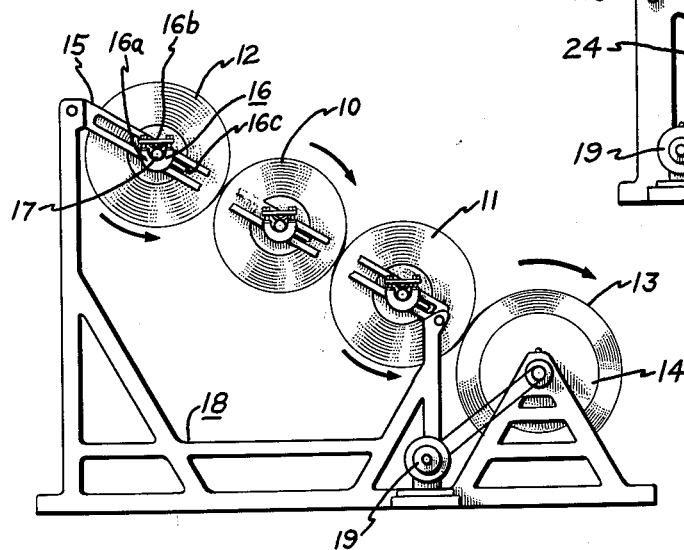

2,983,459

METHOD AND APPARATUS FOR WINDING COILS OF WEB MATERIAL

Willard F. M. Gray and William C. Hurt, Jr., Pittsfield, Mass., assignors to General Electric Company, a corporation of New York Filed Jan. 20, 1958, Ser. No. 709,862

9 Claims. (Cl. 242—67.3)

The present invention relates to the winding of web material in coil form, and more particularly to the forming of foil wound electrical coils and improved winding apparatus therefor.

Foil wound transformers, i.e., transformers having coil windings formed of concentrically wound insulated foil, offer numerous advantages over the more conventional transformers employing wire coil windings. The foil wound coil occupies less space and its improved electrical properties make it possible to reduce the size of the core without sacrifice of electrical capacity of a transformer. Of particular advantage is the relative ease of winding the foil and inserting taps or leads therein, operations which lend themselves quite readily to mechanization, in contrast to the usual wire coil construction in which many hand operations are necessary.

As used herein the expression "foil wound coil" refers to a coil of given axial length formed by flatwise winding on itself a suitably insulated ribbon or strip of one or more plies of low specific electrical resistance material whose width is substantially equal to the axial length of the coil and whose thickness corresponds to that of the foil form of the material, which may be no more than a few mils, so that each turn of the ribbon or strip constitutes one complete layer of the coil. In typical arrangements, the conductor foil is interwound with one or more thin webs of insulating material such as paper, synthetic resin film and the like to electrically insulate the turns of the foil from each other.

In continuously winding the coils of a foil wound transformer, it is important that the turns of foil and insulation on the coil be smooth and wrinkle-free, in order to avoid irregularities in the coil winding which are susceptible to electrical breakdown during operation and which result in irregularly formed coils having a poor space factor. Difficulty in this regard is especially experienced in attempts to wind sheet material of large widths, such as of the order of 60 inches or more, in order to form large size foil wound coils for power transformers and other high rating induction apparatus. Such large sheets, and especially the insulating paper sheets, are particularly subject to wrinkling and other surface irregularities both in being handled before the winding procedure and in the course of winding. Consequently even if the foil itself is relatively smooth, the wrinkled paper sheet leads to irregular coil turns and the disadvantages described above.

Various types of winding arrangements for winding paper and the like into rolls or coils are already known, but the known devices have not been found fully satisfactory for producing electrical coils, especially for large size foil wound transformers of the type mentioned above. Among the drawbacks of the prior art web winding apparatus has been their inability to produce coils sufficiently free of wrinkles and having the necessary density and tightness for electrical purposes. In general, the prior devices have relied on tension applied to the web of material being wound to provide tight coil windings where desired, but the tension that can be applied is limited by the strength of the web material. In other cases, the winding apparatus employs a number of components such as transfer rollers, crown bars, stationary bars and the like which make it cumbersome and expensive, and makes necessary careful adjustment and maintenance of the parts for proper operation.

It is an object of the invention to provide an improved method and arrangement for winding coils of web material which overcome the disadvantages mentioned above.

It is a further object of the invention to provide a method and apparatus for winding tight, wrinkle-free coils of foil wound form for use in transformers, capacitors and the like.

With the above objects in view, the present invention in a broad aspect relates to a method and apparatus for winding coils which provide for the arrangement of a supply roll of the sheet material to be maintained in pressure contact with the coil as it is being wound so that the sheet material transfers directly to the coil in the region of contact, and with the sheet material being held in tension as it is being wound on the coil.

The invention will be better understood from the following description taken in conjunction with the accompanying drawing, in which:

Fig. 1 is a perspective view of an apparatus for practicing the invention;

Fig. 2 is a side view of one embodiment of the apparatus of the invention for forming multi-ply coil layers; and Fig. 3 is another embodiment of the present invention for forming multi-ply coil layers.

Referring now to the drawing, there is shown in Fig. 1 a simple form of the present apparatus, which comprises an arbor or mandrel 1 mounted on frames 8, 8' and rotatable by suitable means such as motor 2 for winding on the periphery thereof a coil 3 of web material. Adjacent to arbor 1 is support means 4 having an upright member 4' for holding the supply roll 5 of the web material, such as kraft paper, to be wound into a roll or coil form on mandrel 1, it being understood that a similar upright member (not shown) is arranged at the opposite end of roll 5. Support 4 is turnable about pivot 6 and urged by load 7, or the equivalent, which is secured thereto toward mandrel 1 for yieldably holding supply roll 5 with suitable pressure in direct contact with coil 3. As will be evident, rotation of arbor 1 in the direction of the arrow as shown causes opposite rotation of the supply roll with concurrent transfer of the web from the roll 5 to coil 3 at the point of contact.

To provide the necessary tension on the web as it is being wound on coil 3, axle 5' of supply roll 5 is preferably engaged by an adjustable resilient bearing means 9 or other equivalent means mounted on support member 4 for braking to a desired degree the rotational motion of supply roll 5. In certain cases, as where the supply roll is of relatively fragile web material such as mica or asbestos, it may be preferable to employ a separate cylindrical bar or the like (not shown) bearing against the outer periphery of supply roll 5 and suitably retard the rotation of the bar to provide the necessary braking action on the supply roll, instead of braking the supply roll shaft 5' as shown.

Fig. 2 shows an embodiment of the present apparatus which may be used to wind an inductive coil for use in foil wound transformers. In this arrangement, rolls 10, 11 of insulating material such as kraft paper and roll 12 of foil such as aluminum foil are arranged in tandem, i.e., series, rolling relation with each other and with arbor 14 on which a coil 13 is to be wound and which is rotatable by motor 19. It will be understood that the rolls need not be arranged in a straight line as shown. In the winding operation the respective sheets of paper and foil pass around the periphery of the adjacent rolls in proceeding from roll to roll towards arbor 14, such that one web transfers from roll 12 to roll 10, two webs from roll 10 to roll 11, and three webs from roll 11 to coil 13. Such an arrangement provides for a coil having convolutely wound layers of foil separated by two sheets of paper dielectric, but it will be evident that any desired number of rolls of paper and rolls of foil can be used, in order to produce a corresponding number of plies of the dielectric sheet and foil conductor in the wound coil.

The plurality of supply rolls as shown in the apparatus of Fig. 2 are mounted with the ends of their axles in an inclined slotted rack 15 mounted on frame 18, it being understood that a similar slotted rack (not shown) is provided at the opposite ends of the rolls. By this arrangement, the rolls 10, 11 and 12 are free to move under the action of gravity toward winding arbor 14, and in this way sufficient pressure is applied to urge the supply rolls into contact with each other and with the periphery of coil 13 as the latter is being wound. To provide the necessary tension on the webs as they transfer from roll to roll and to the coil, braking means 16 is applied to the axle of each roll. The particular braking means 16 illustrated comprises a seat 16a for receiving the axle 17 and has a resilient bearing member 16b adjustably mounted thereon for yieldably engaging axle 17. Arm 16c fixedly secured to member 16a fits into and slidably engages rack 15 to prevent rotation of braking means 16 during rotation of axle 17. The frictional engagement of braking means 16 with axle 17 thus provides the necessary braking of the rotation of the supply roll. It will be evident, however, that other types of brake devices could be used, if desired.

If necessary, supplementary contact pressure may be applied when the supply rolls are depleted by means of weights hung from the axles of the supply rolls, by inclining the rack to a steeper slope, or by any other suitable means.

Instead of the gravity arrangement shown in Fig. 2, separate pivoted supports with the necessary contact urging means may alternatively be provided for each of the supply rolls in a manner such as shown in Fig. 1.

Since it has been found that it is not always necessary to arrange the foil supply roll in pressure contact with another roll or with the coil being wound to avoid wrinkles in the foil sheet, it is possible to arrange the foil supply roll at a point spaced from the surface of the coil being wound and transfer the foil directly to the coil. If desired, more than one foil roll may be placed in tandem with the paper supply rolls in the proper arrangement relative thereto to provide the desired disposition of foil sheets and paper sheets in the wound coil. In general, however, it has been found desirable to avoid arranging two foil supply rolls in tandem with each other because the frictional contact of the two foil sheets prior to reaching the coil surface has an adhesive effect between the two sheets which leads to poor and irregular layers of the foil as they are laid on the coil. Where a double-ply layer of foil is desired, it is possible to avoid the above difficulty by arranging two foil supply rolls at spaced circumferential points in contact with the coil being wound, in the manner similar to that of the device of Fig. 3. A variety of arrangements of paper rolls and foil rolls will accordingly be evident to those skilled in the art to provide a desired number of foil conductors and intervening sheets of insulating paper therebetween, provided the above limitations are observed.

In the multiple contact embodiment shown in Fig. 3, each of the paper and foil supply rolls are placed in direct contact with the periphery of the coil and in rolling relation therewith. Thus, foil supply roll 20 and paper supply rolls 21, 22 are mounted with the opposite ends of their axles 27 in corresponding slots of a frame 23, so that they are each held by gravity in pressure contact and rolling relation with the coil 24 as it is wound on arbor 25. Braking means, such as leaf springs 26 secured to frame 23 and in frictional engagement with the supply roll axles, or any other equivalent braking means, are employed to provide the necessary tension on the web of each roll as it is transferred to the coil. Springs 26 also serve to apply added contact pressure to supplement the lessening weight of the supply rolls as they become depleted. It will be evident in this case also that the number and arrangement of the supply rolls on the periphery of the coil may vary from that shown to obtain the desired disposition and number of layers of insulating and foil material in the wound coil without going beyond the scope of the invention.

It will be further understood that where a plurality of supply rolls of web material is to be employed, a combination of series and multiple contact arrangements could be used. For example, any of the supply rolls arranged in series may have one or more other supply rolls in direct contact therewith. Further, in an arrangement such as shown in Fig. 3, one or more supply rolls may be placed in series contact with any or all of the coil-contacting supply rolls without contacting the coil being formed.

This invention offers numerous advantages in winding coils of web material. It is possible in accordance therewith, for example, to utilize very densely wound and wrinkle-free paper rolls as received from the supplier by arranging them in direct contact with an electrical coil being formed therefrom and to wind a coil which is similarly dense and free of wrinkles. In this process, the wrinkle-free paper webs transfer from their own rolls to the periphery of the winding arbor or the coil thereon while still being in contact with at least one of the rotating surfaces at the time and at the region of transfer. This technique prevents the formation of wrinkles and folds which otherwise occur in conventional winding procedures, wherein the web is left free of any supporting surface for a substantial distance. Wrinkles formed during conventional winding of thin papers are frequently caused, under such circumstances, by the absorption of moisture from the surrounding air, and this appears to reduce the degree of initial tension which is imparted to the supply roll during its original winding and which is necessary to maintain the paper in wrinkle-free condition. Also, by virtue of providing firm support for the web at the region of its transfer to the coil roll, the necessary degree of tension may be applied to the web being transferred with much less risk of breakage of the web than would be attendant in the case where the web is transferred between rolls separated a substantial distance from each other.

The invention enables the production of tightly wound coils having excellent electrical properties such as low power factor and low corona starting voltage, as well as providing better space factor with equivalent electrical ratings.

The present invention, furthermore, provides a simple and space saving apparatus for winding one or a multiplicity of thin webs in tight, dense, wrinkle-free coils without the cumbersome and expensive winding apparatus previously employed in the prior art. Moreover, the present arrangement avoids the need for careful alignment of supply roll and winding arbor which was normally necessary in prior art devices due to their widely separated locations, since in the present case the direct contact of the supply and receiving rolls makes the alignment an extremely simple task.

The disclosed process is of value in facilitating the forming of coils of low strength web materials, such as reconstructed mica and asbestos papers, since the amount of tension applied to the web can be considerably reduced below that necessary in the conventional winding procedures while still producing smooth coil turns.

While the present invention has been described in connection with winding cylindrical coils, it will be evident that the invention is readily applicable to the making of coils of other forms such as oval, rectangular and other curved or polygonal shape. The invention is not limited in application to sheets of any particular width, but as will be evident it is especially advantageous for winding relatively wide sheets, e.g., of the order of 30 inches to 120 inches and wider.

Although not shown herein, coils formed using the present process may have ducts and conducting taps provided therein, particularly where used for large foil wound transformers, as disclosed, for example, in the copending application of Gray et al. Serial No. 646,313, filed March 15, 1957, and assigned to the same assignee as the present invention.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of forming tight, wrinkle-free coils of a plurality of sheets of web material which comprises winding a coil from a plurality of supply rolls of web material arranged with at least one of said supply rolls in pressure contact with the periphery of the coil while maintaining tension on the web material as it is wound on the coil.

2. The method of forming tight, wrinkle-free coils of web material which comprises arranging a plurality of supply rolls of the web material and a rotatable coil support in series rolling relation with one another, and rotating the coil support while transferring the web material from roll to roll and to the coil support at their points of contact for winding a coil of the web material on the coil support, while maintaining the coil support and supply rolls in pressure contact with one another and maintaining tension on the web material as it is wound on the coil.

3. The method of forming tight, wrinkle-free coils of interwound sheets of web material which comprises arranging a plurality of supply rolls of the web material and the coil support in series rolling relation and pressure contact with one another, and with the web material of each succeeding supply roll passing partially around the adjacent supply roll in the direction of the coil support, and rotating the coil support for forming thereon a coil of a multi-ply layer of web material transferred to the coil support from the supply roll adjacent thereto, while applying tension on the web material as it passes from roll to roll and to the coil support.

4. The method of forming tight, wrinkle-free coils of web material which comprises arranging a plurality of supply rolls of web material on the periphery of a coil support in rolling relation therewith, and rotating the coil support while simultaneously transferring the web material from each supply roll to the coil support at their point of contact for forming a coil of multi-ply layer of the web material on the coil support, while maintaining the supply rolls in pressure contact with the periphery of the coil being wound and while applying tension on the web material being wound on the coil.

5. The method as defined in claim 3, wherein at least one supply roll comprises dielectric sheet material and at least another supply roll comprises electrically conducting foil material.

6. The method as defined in claim 4, wherein at least one supply roll comprises dielectric sheet material and at least another supply roll comprises electrically conducting foil material.

7. Apparatus for forming tight, wrinkle-free coils of web material which comprises, in combination, coil support means having a coil of web material partially wound thereon, means holding a plurality of supply rolls of web material arranged to be wound on the coil support means to form the coil thereon with at least one supply roll in rolling relation with the coil support means and the coil thereon, the web material from said one supply roll extending directly therefrom to the coil on said coil support means at the region of rolling contact therewith, and means for rotating the coil support means for winding thereon a multi-ply layer of web material from said supply rolls.

8. Apparatus for forming tight, wrinkle-free coils of web material, which comprises, in combination, coil support means for forming a coil of web material thereon, means for holding a plurality of supply rolls of web material and the coil support means in series rolling relation with each other, whereby the web material unwound from each of the succeeding supply rolls passes partially around the adjoining supply roll as it moves toward the coil being wound and transfers from roll to roll and to the coil support means at their points of contact, means for rotating the coil support means for winding thereon a multi-ply layer of web material from said supply rolls, and means for applying tension on the web material as it passes from roll to roll and to the coil support means.

9. Apparatus for forming tight, wrinkle-free coils of web material which comprises coil support means for forming a coil of web material thereon, means for holding a plurality of supply rolls of web material each in rolling relation and pressure contact with the coil support means and the coil adapted to be formed thereon, means for rotating the coil support means and said supply rolls relative to each other to wind the web material in multi-ply layers on the coil support means, whereby the web material transfers directly from the respective supply rolls to the coil during the winding operation at the point of contact therewith, and means for applying tension on the web material from each supply roll as it is wound on the coil.

References Cited in the file of this patent

UNITED STATES PATENTS

| | | |
|---|---|---|
| 339,796 | Manning | Apr. 13, 1886 |
| 1,353,634 | Crandell | Sept. 21, 1920 |
| 1,825,783 | Dunning et al. | Oct. 6, 1931 |
| 1,829,727 | Barrett | Nov. 3, 1931 |
| 1,841,562 | Warren | Jan. 19, 1932 |
| 1,907,761 | Eitzen | May 9, 1933 |
| 2,788,594 | Levander | Apr. 16, 1957 |